No. 803,637. PATENTED NOV. 7, 1905.
F. A. STICKEL, Jr.
GARMENT SUPPORTER CLASP.
APPLICATION FILED NOV. 9, 1904.

Witnesses.
Frank P. Bilow.
H. C. Rodgers

Inventor
F. A. Stickel Jr.
By George J. Hoff
atty.

UNITED STATES PATENT OFFICE.

FLETCHER A. STICKEL, JR., OF MUSKOGEE, INDIAN TERRITORY.

GARMENT-SUPPORTER CLASP.

No. 803,637.   Specification of Letters Patent.   Patented Nov. 7, 1905.

Application filed November 9, 1904. Serial No. 232,050.

*To all whom it may concern:*

Be it known that I, FLETCHER A. STICKEL, Jr., a citizen of the United States, residing at Muskogee, Creek Nation, Indian Territory, have invented certain new and useful Improvements in Garment-Supporter Clasps, of which the following is a specification.

This invention relates to garment-supporter clasps, and is designed more especially for use on a hose or stocking supporter, though it may be utilized for other purposes; and my object is to produce a device of this character which can be manipulated easily and quickly to secure two parts together or effect their separation, secures said parts together efficiently and reliably and in such relation that injury shall result to neither, and secures them together with a "flat effect," which is peculiarly desirable when one of such parts is a stocking or hose, in order that the device may lie flatly against the limb of the wearer, and therefore impose no undue pressure on the limb to abrade or otherwise injure it, and which is of simple, strong, durable, and cheap construction.

With these objects in view the invention consists in certain novel and peculiar features of construction and organization, as hereinafter described and claimed, and in order that it may be fully understood reference is to be had to the accompanying drawings, in which—

Figure 1:
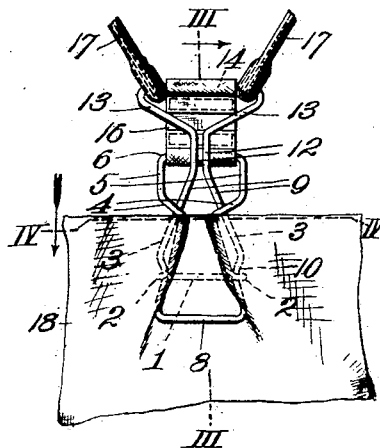
Figure 2:
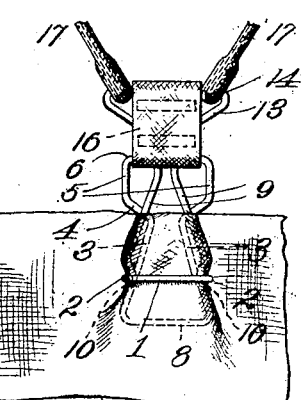
Figure 3:
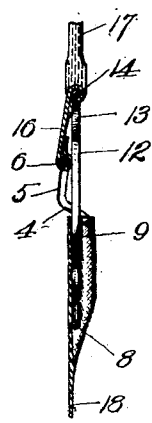
Figure 4:
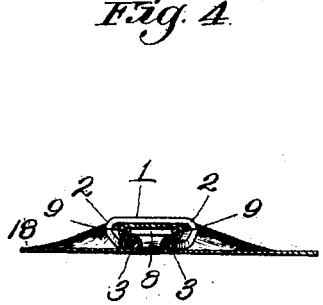
Figure 5:
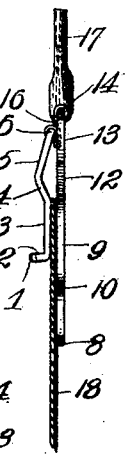
Figure 6:
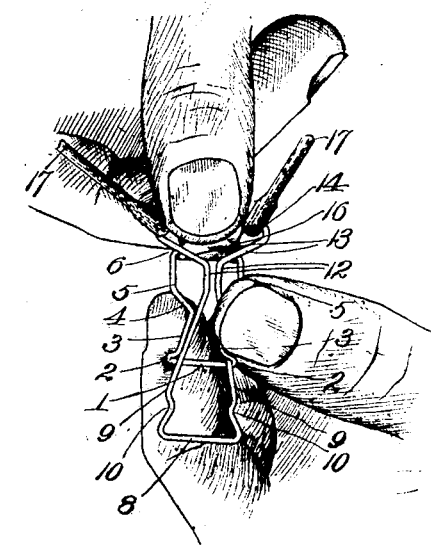
Figures 7, 8:
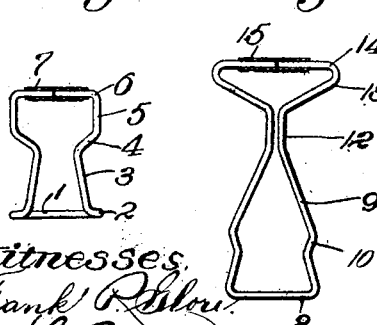

Figure 1 is a face view of the clasp or fastener, said view also showing the same as a hose or stocking support. Fig. 2 is a rear view of the same. Fig. 3 is a central vertical section taken on the line III III of Fig. 1. Fig. 4 is a horizontal section taken on the line IV IV of Fig. 1. Fig. 5 is an edge view of the device with its members at the inner and outer sides of the hose and disposed in the relative positions they occupy preliminary to clamping the hose between them. Fig. 6 is a front view of the clasp or fastener detached from the hose, but with its members shown as pressed together after being disposed in the position shown in Fig. 5 and ready to clamp the hose reliably in place by the relative downward movement of the rear member and upward movement of the front member. Fig. 7 is a front view of the rear member. Fig. 8 is a face view of the front member.

In the construction of the clasp or fastener spring-wire, such as heavy piano-wire, is preferably employed. The rear member is produced by bending a piece of spring-wire to form the cross-piece 1, the inwardly-disposed hooks 2 at the ends of said cross-piece, the upwardly-converging arms 3, rising from the inner or front ends of said hooks, the outwardly and rearwardly diverging shoulders 4 at the upper ends of arms 3, the substantially vertical arms 5 at the outer ends of shoulders 4, and the top cross-piece 6 at the upper ends of said arms 5, the cross-piece 1 and the junction-point of shoulders 4 and arms 5 occupying approximately the same vertical plane, which plane is rearward of and substantially parallel with that occupied by the upwardly-converging arms 3 and cross-piece 6. The top cross-piece 6 is of course broken, because formed by the meeting end portions of the wire, and said ends may be soldered together, (not shown,) but preferably will be united by a closely-fitting sleeve 7, as shown in Fig. 7. The front member is produced by bending a second piece of spring-wire to form a cross-piece 8 a little longer than cross-piece 1, arms 9 projecting upward from the ends of the cross-piece 8 and converging, by preference, at about the same angle as arms 3, but approaching nearer together than said arms 3 in order that they may be slipped through the space between the latter, and said upwardly-converging arms 9 are kinked to produce external cavities 10 near their lower ends. From the upper ends of arms 9 extend substantially parallel portions 12, and from the upper ends of the latter, arms 13 diverge upwardly and outwardly and are bent inward to produce the top cross-piece 14, which, like the equivalent cross-piece 6, may be soldered, but preferably will be united by a closely-fitting sleeve 15, and connecting the top cross-pieces of the two members is a short flexible tape or equivalent connection 16, the same being of such length that when about fully extended the hook portions 2 of the rear member shall lie in the same horizontal plane as the cavities 10 of the front member.

17 designates the lower ends of the tapes or cords of a hose-supporter—such, for instance, as the Boston garter—or the support for the front member may be tapes leading from a corset or belt or a child's waistband, it being obvious that the special means for supporting the front member is immaterial as far as this invention is concerned.

Assuming that the support represented by the tapes or cords is in position and that it is desired to support a hose, (represented at 18,) the wearer first disposes the rear member within the hose to about the depth shown in the drawings and then by either pulling upward on said member and the hose or by pulling downward on the front member, which gives exactly the same effect, the upper portion of the converging arms 9 is brought opposite the converging arms 3, as shown in Fig. 5. The operator then presses the two members together, so that the upper portions of the converging arms 9 and the proximate portion of the hose shall be forced back through the space between converging arms 3 and against cross-piece 1, this stage of the operation being shown most clearly in Fig. 6, though the hose is omitted from said figure. The operator then effects relative opposite sliding movement of the members upon each other, so as to draw the converging arms 9 upward and clamp the stocking or hose into the hooks 2. In this upward movement, because of the fact that arms 9 diverge downward until they are a greater distance apart than arms 3, said arms 9 pass outward of arms 3, and thereby fold the stocking around said arms 3 and against the shoulders 4 at the upper ends of said arms, and in such upward movement eventually said arms 9 are sprung inward slightly, this action being immediately followed by their expansive action when the cavities 10 come opposite or register with hooks 2, the engagement of said hooks and cavities kinking the interposed portion of the stocking, and thus providing additional points for reliably securing the same, as shown most clearly in Fig. 2. To release the hose or stocking, the operator with his thumb applies downward pressure on the front member and upward pressure on the rear member with a finger, this action resulting in overcoming the resistance offered by converging arms 9 and springing the same slightly together, so as to first effect the disengagement of the hooks and cavities, and then eventually redispose the members in the position shown in Fig. 6, when the members can be slipped apart, as will be readily understood.

From the above description it will be apparent that I have produced a clasp or fastener which can be used for various other purposes than that to which special reference has been made and which is obviously susceptible of modification in its form, proportion, detail construction, and arrangement without departing from the essential spirit and scope or sacrificing any of the advantages of the appended claims. I may also find it desirable to apply rubber tubing to the binding parts of the clamp to reduce the wear on the hose.

Having thus described the invention, what I claim as new, and desire to secure by Letters Patent, is—

1. In a device of the character described, the combination of a rear member having a bottom cross-piece, forwardly-projecting and inwardly-turned hooks at the ends of the same, and upwardly-converging arms rising from said hooks and occupying a plane forward of said cross-piece, and a front member bearing a sliding relation with the rear member and comprising upwardly-converging arms to occupy the plane between the cross-piece and upwardly-projecting arms of the rear member; said upwardly-converging arms of the front member having external cavities interlocked with said hooks and pressing yieldingly outward against the same.

2. In a device of the character described, the combination of a rear member having a bottom cross-piece, forwardly-projecting and inwardly-turned hooks at the ends of the same, upwardly-converging arms rising from said hooks and occupying a plane forward of said cross-piece, rearwardly and outwardly diverging shoulders at the upper ends of said arms, upwardly-projecting arms at the rear and outer ends of said shoulder, and a cross-piece uniting the upper ends of said arms, a front member bearing a sliding relation with the rear member and comprising upwardly-converging arms to occupy the plane between the first-named cross-piece and upwardly-projecting arms of the rear member and rearward of said shoulders and pressing outward against the hooks and shoulders of said rear member, and having a cross-piece above said upwardly-converging arms, a support connected to said cross-piece, and a flexible connection connecting the upper cross-pieces of the members.

3. A fastening device, comprising a rear member, embracing a bottom cross-piece, forwardly-disposed hooks at the ends of the same, and upwardly-converging arms at the inner ends of the hooks, in combination with a front member embracing a bottom cross-piece, and upwardly-converging arms rising from the ends of said cross-piece and adapted to lie in the plane between the cross-piece and converging arms of the first-named member, and provided with external cavities to engage the hooks of the first-named member.

4. A fastening device, comprising a rear member, embracing a bottom cross-piece, forwardly-disposed hooks at the ends of the same, and upwardly-converging arms at the inner ends of the hooks, in combination with a front member embracing a bottom cross-piece, upwardly-converging arms rising from the ends of said cross-piece and adapted to lie in the plane between the cross-piece and converging arms of the first-named member and provided with external cavities to engage the hooks of the first-named member, a flexible connection between the members to permit of independent movement thereof, and a support for the front member.

In testimony whereof I affix my signature in the presence of two witnesses.

FLETCHER A. STICKEL, JR.

Witnesses:
VESTER ROSE,
A. E. BONNEY.